Figure 1:
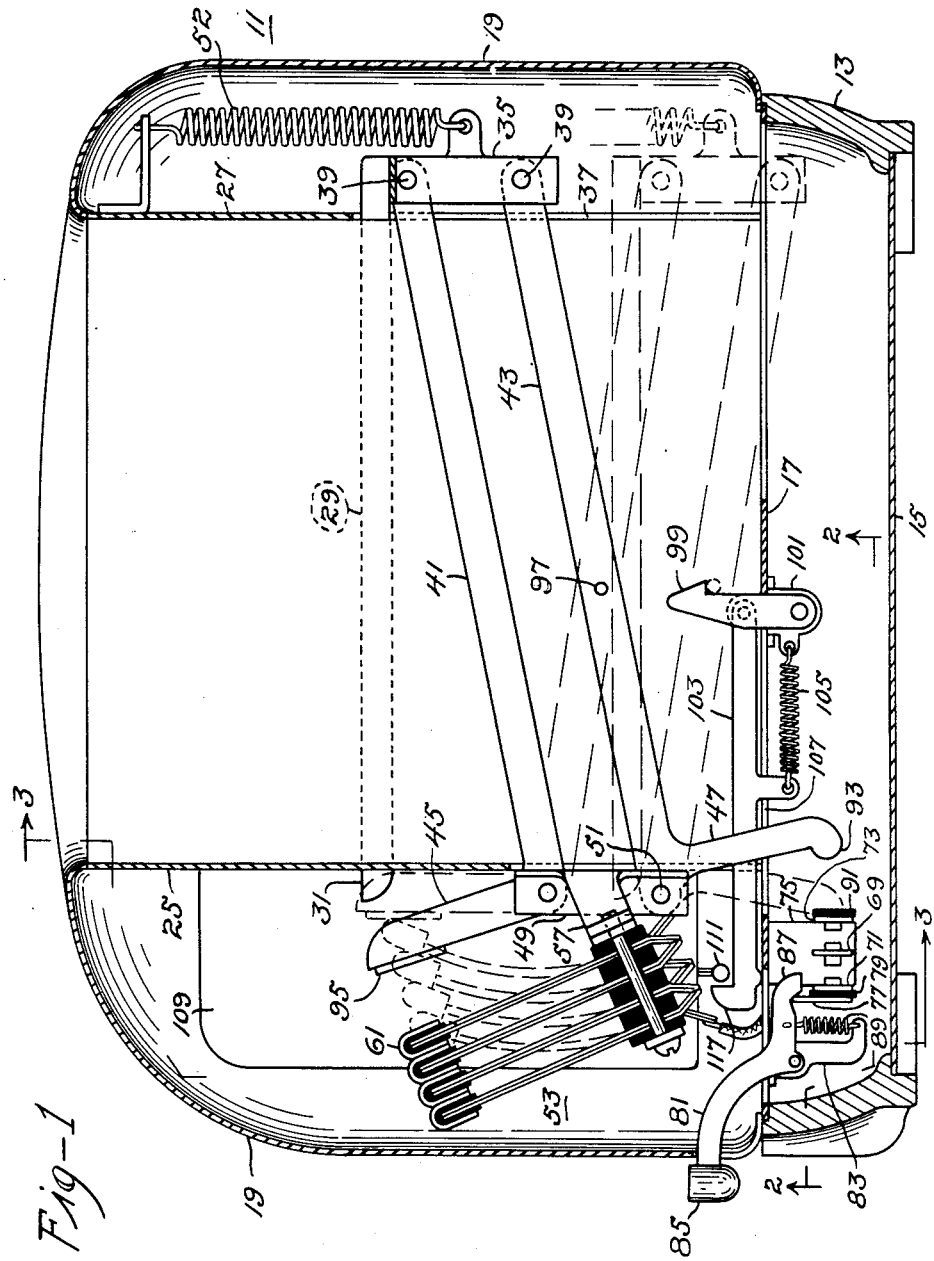

Dec. 21, 1943.    J. R. GOMERSALL    2,337,098
THERMAL TORQUE UNIT
Filed Nov. 21, 1941    3 Sheets-Sheet 1

INVENTOR.
JOHN R. GOMERSALL
BY
*H. M. Biebel*
ATTORNEY

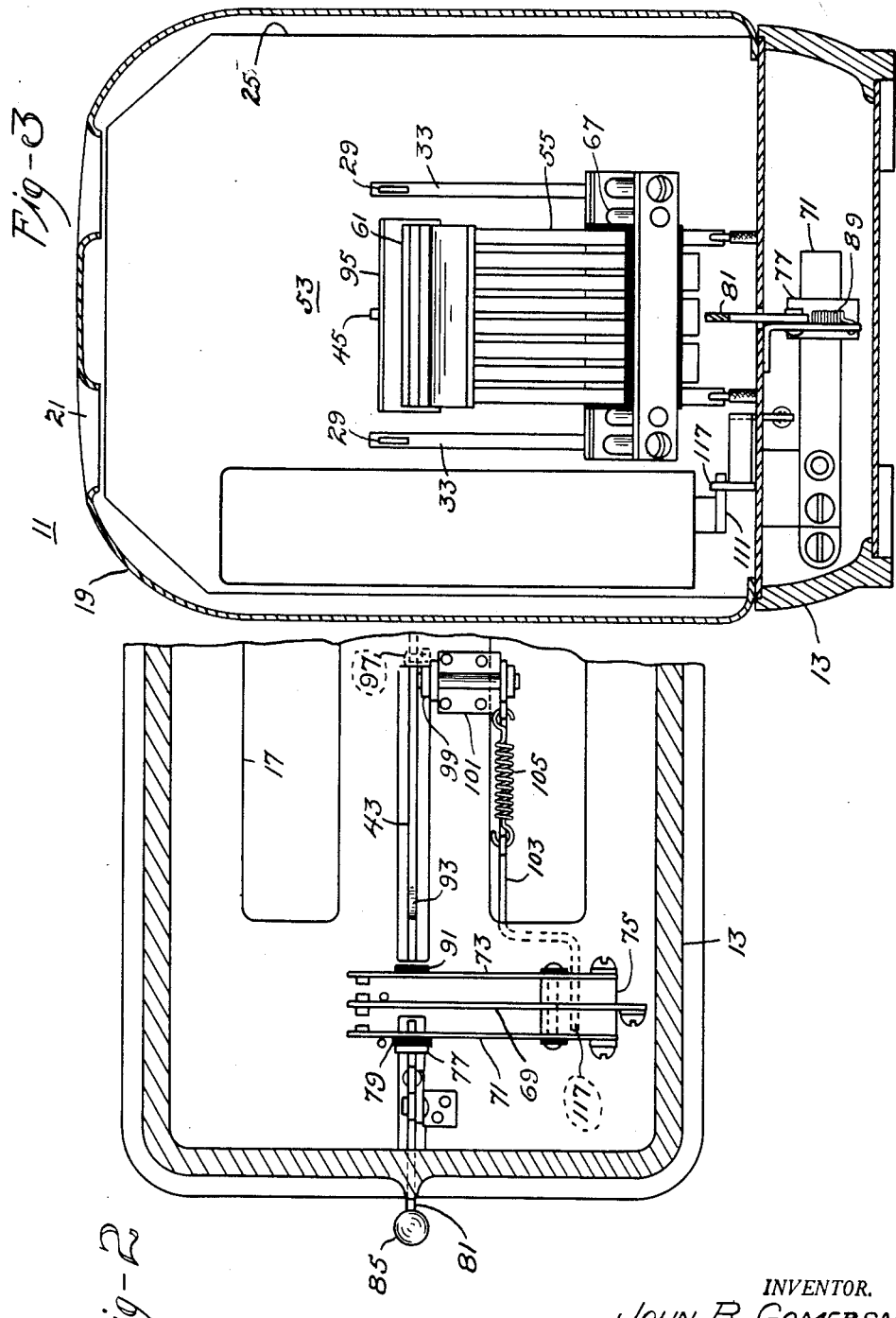

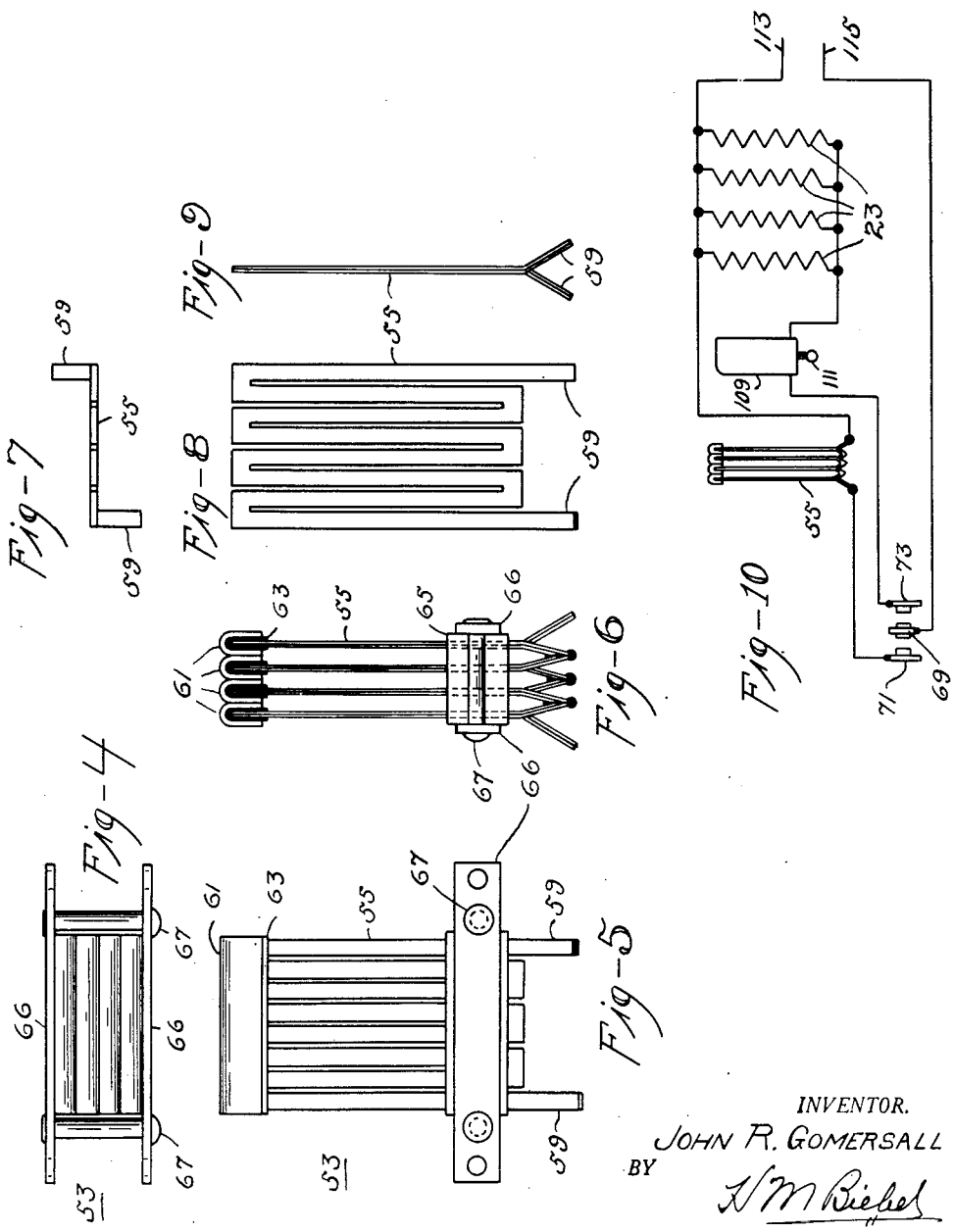

Patented Dec. 21, 1943

2,337,098

UNITED STATES PATENT OFFICE 2,337,098

THERMAL TORQUE UNIT

John R. Gomersall, Elgin, Ill., assignor to McGraw Electric Company, Elgin, Ill., a corporation of Delaware Application November 21, 1941, Serial No. 419,891

5 Claims. (Cl. 99—329)

My invention relates to electric cooking devices and particularly to automatic electric toasters.

An object of my invention is to provide relatively simple means for initiating a toasting operation.

Another object of my invention is to provide a thermal power unit for initiating a toasting operation.

Another object of my invention is to provide a thermal power means for causing movement of a toaster bread carrier from non-toasting to toasting position.

Other objects of my invention will either be obvious from a description of one form of device embodying my invention or will be pointed out in the course of such description and set forth particularly in the appended claims.

In the drawings,

Figure 1 is a longitudinal vertical sectional view taken through the center of a toaster showing the application of the thermal torque unit, Fig. 2 is a fragmentary horizontal sectional view on the line 2—2 of Fig. 1, Fig. 3 is a vertical cross-sectional view on the line 3—3 of Fig. 1, Fig. 4 is a top plan view of a thermal power or torque unit, Fig. 5 is a front view of the member shown in Fig. 4, Fig. 6 is a side view of the device shown in Fig. 5, Fig. 7 is a top view of one of the bimetal bars used in my thermal power unit, Fig. 8 is a front view of a bimetal bar of my thermal power unit, Fig. 9 is a side view of the device shown in Fig. 8, and, Fig. 10 is a diagram of the electric circuits.

In one of the automatic electric toasters manufactured and sold at the present time, the bread carrier is adapted to normally occupy a non-toasting position relatively to the toast heating elements and to be moved manually into a lowered or toasting position, to initiate a toasting operation.

Another form of automatic electric toaster discloses an electromagnet for causing downward movement of the bread carrier, which is normally yieldingly biased into an upper or non-toasting position, into toasting position.

In contradistinction to this I provide a thermal torque or power unit and the application of such unit embodying my invention to an automatic electric toaster will now be described.

An automatic electric toaster is designated generally by the numeral 11 and may include a lower skeleton frame 13 of moulded plastic material having a bottom closure plate or crumb tray 15 associated therewith and having also a base plate 17 secured thereto at or adjacent to its upper edge. The toaster includes an outer casing 19 which is shown generally only but may be made according to any of the present toaster casings as of thin sheet metal and of one or of several associated parts, all in a manner now well known in the art.

I have illustrated generally only a two-slice toaster adapted to toast two slices of bread at the same time and in accordance with this the top part of the outer casing 19 is provided with two bread-inserting and toast-removing slots 21. I have shown also a pair of electric heating elements 23 for each slice of bread to be toasted simultaneously and while I have shown these schematically and generally only in Fig. 10 of the drawings, it is to be understood that these toast heating elements include a strand of resistor now used for such heating elements, which resistor strand may be supported by a thin sheet or sheets of electric insulating material, such as mica, all in a manner well known in the art.

A toasting chamber is provided within the casing 19, defined by the side walls thereof and by a front intermediate wall 25 and a rear intermediate wall 27, which may be supported by any desired and now well known means in their proper operative fixed positions within the outer casing 19.

I provide a pair of bread carriers 29 between each outer pair of toast heating elements 23 and below the bread-inserting openings 21 hereinbefore mentioned. The bread carriers have front end portions 31 adapted to extend through slots 33 in the front intermediate wall 25 and they have also rear end portions 35, of substantially L-shape, adapted to extend through slots 37 in the rear intermediate wall 27, means such as rods 39 being provided to mechanically rigidly connect the two rear end portions 35 together so that movement of the two carriers vertically in the toasting chamber or chambers may be effected in a manner well known in the art.

I provide a movement-multiplying parallel-motion linkage including an upper arm 41 and a lower arm 43, the rear ends of which are pivotally connected to the two rods 39. Upper arm 41 is provided with an upwardly-extending lateral extension 45 and the lower arm 43 is provided with a depending lateral extension 47, these two extensions being for purposes to be hereinafter referred to.

I provide a bracket plate 49 which may be integral with the front intermediate plate 25 as by being bent laterally outwardly therefrom and the front end of the two arms 41 and 43 are pivotally mounted on the bracket plate 49 by pins or studs 51 in substantially the relative positions shown in Fig. 1 of the drawings. It is obvious that if the upper end of projection 45 is moved through a given distance in a clockwise direction, the parallel-motion linkage including particularly the arms 41 and 43, will turn in a clockwise direction and cause downward straight line movement of the carriers 29 through a greater distance than that through which the end of arm 45 was moved. A spring 52 is provided to normally yieldingly bias the bread carriers in their upper or non-toasting position, the respective ends of the spring being connected to a bracket on the rear intermediate wall 27 and to an extension on one of the members 35.

A thermal power or torque unit 53 includes a plurality of bimetal bars 55 (see Fig. 8) assembled as will be hereinafter described and supported by a bracket 57 also supported by or integral with front intermediate plate 25. Referring now particularly to Figs. 4 to 9 inclusive, I have there illustrated the general details of construction of my thermal torque unit and reference may first be made to Figs. 7, 8 and 9 which show a bimetal plate 55 having a plurality of longitudinal slots alternately open at opposite ends of the plate with terminals 59, one terminal being at each end of the plate. This provides an elongated and relatively tortuous current path through a plate of longitudinal shape whereby a current path of relatively high resistance is provided. I provide a clamping clip 61, of substantially U-shape, over that end of the plate 55 away from the terminals 59 and this is preferably made of relatively thin strong sheet metal and an insulating member 63, which may be made of mica bent to substantially U-shape, is interposed between the bimetal plate 55 and the clip 61. It is to be noted that the width of member 61 is but slightly greater than the width of bimetal bar 55. The clips 61 serve to hold the slotted end of each bar 55 in alined position.

A plurality of bimetal plates 55 with the clips 61 secured thereto are then held by a plurality of blocks 65 of electric-insulating material held together as by clamping bars 66 and rivets 67 whereby additive effect and action of the plurality of slotted plates or bars 55 is obtained. Reference to Fig. 6 will show that the terminals 59 of the adjacent bimetal bars or plates 55 are connected together electrically, as by soldering or welding, so that the path of current flow through the plurality of bimetal bars may be in series electric circuit or in series parallel circuit thereby providing a proper resistance to the current flow depending on the voltage applied to the thermal unit. Reference to Fig. 10 of the drawings will show that these bimetal bars are connected directly across the energizing circuit, under certain operating conditions and it is, of course, to be understood that the number of slots in the respective bimetal bars 55 and therefore the width of the current path will be selected so that relatively quick heating will be effected when current flows through the thermal torque unit, with attendant quick flexing of the free ends of the bimetal bars 55 in a clockwise direction to the position shown in broken lines in Fig. 1 of the drawings. For illustrative purposes I may state that I have obtained a flexing movement of the free ends of such a thermal torque unit 53 through a distance approaching three-quarters of an inch in a length of time on the order of one second.

Means for controlling the energization of the thermal power or torque unit 53 and of the toast heating elements 23 includes a switch having three contact arms, an intermediate contact arm 69 and two outer contact arms 71 and 73 which may be supported from the base plate 17 as by blocks 75 of electric insulating material held by any suitable or desired means against the under surface of base plate 17. Contact arm 71 is normally yieldingly biased into engagement with the intermediate contact arm 69 while contact arm 73 is normally yieldingly biased out of engagement with contact arm 69. Contact arm 71 has mounted thereon a latch 77 in the form of a small metal plate insulated from contact arm 71 by a member 79, of L-shape and of electric insulating material.

A detent arm 81 of substantially L-shape is pivotally mounted on a bracket 83 secured to the under surface of base plate 17 and the larger arm, of arcuate shape, of this detent arm, extends through a slot in the front wall of outer casing 19 and has an actuating knob 85 thereon adapted to be moved downwardly by an operator. Detent arm 81 has a second arm 87 with a hook-shaped end thereon, this arm extending substantially horizontally and a biasing spring 89 is used to normally yieldingly bias the hook-shaped end downwardly into engaging position with the upper edge of latch plate 77, substantially as shown in Fig. 1 of the drawings.

Contact arm 73 is provided with a member 91 of substantially flat shape and made of electric-insulating material, which is secured against the outside surface of arm 73. It may be here pointed out that upon downward pressure of an operator on knob 85 contact arm 71 is released from its normal locked position with portion 87 of detent 81 and it will move in a clockwise direction, as seen in Fig. 2, until it engages contact arm 69.

When the parallel-motion linkage has been moved in a clockwise direction, the lower rounded end 93 on the depending arm 47 is adapted to engage with the electric-insulating member 91 and cause it to move in a left-hand direction, as seen in Fig. 1 of the drawings, whereby contact arm 73 is caused to engage contact arm 69 and the three contact arms are moved in a left-hand direction. It may be here noted that the inner edge of the hook-shaped end of portion 87 of the detent arm extends angularly relatively to the plane of the plate-like latch member 77. This is to ensure that contact arm 71 will be moved out of engagement with contact arm 69 upon engagement of contact arm 73 with contact arm 69, as seen in Fig. 1. As soon as the upper edge of latch plate 77 moves under or slightly beyond the lower edge of the outer end of portion 87 of detent 81, the spring 89 will cause turning movement of detent arm 81 in a clockwise direction until it is moved into substantially the position shown in Fig. 1. This sequence of operation ensures that the toast heating elements 23 will be energized before the thermal torque unit 53 is deenergized and also that the contact arm 71 is moved out of engagement with contact arm 69 and into holding engagement with detent 81 as soon as the bread carrier has been moved into toasting position. I may provide a plate 95 at the upper end of arm 45 to be engaged by the nearest clip 61 on the thermal torque unit 53, this plate extending laterally of the arm 45, of bar shape, to provide a bearing surface thereon to be engaged by the relatively long clip 61.

In order to hold the carrier in its lowered and toasting position I provide a pin 97 at the proper position on link or arm 43 which is adapted to be engaged by a hook-shaped detent arm 99 pivotally supported as by a pair of brackets 101 secured to the under surface of plate 17. The member 99 has a release arm 103 connected thereto at a point intermediate the ends of arm 99, arm 103 being located a small distance above and parallel to the upper surface of plate 17. A coil spring 105 connected with the bracket 101 and a depending extension of arm 103 tends to normally yieldingly bias arm 99 in a clockwise direction against an end wall of a slot 107 in plate 17.

I provide a timer 109 which may be of any suitable or desired type and may, for instance, be of the kind disclosed and claimed in my copending application Serial No. 328,829, filed April 10, 1940, and assigned to the same assignee as is the present application. I have shown the timer 109 in general only and have shown particularly a depending arm 111 which is adapted to be moved in a clockwise direction, as seen in Fig. 1 of the drawings, upon the termination of a toasting operation as defined by the timer 109. It will be noted by reference to Fig. 10 of the drawings that I have shown a conductor connecting the toast heating elements 23 with one terminal of the thermal timer, the other terminal of the thermal timer being connected to contact arm 73. One terminal of the thermal torque unit 53 is connected to one supply circuit conductor 113 while the other terminal of the thermal power or torque unit is connected by a conductor with contact arm 71. Contact arm 69 is connected by a conductor with the other supply circuit conductor 115.

The operation of the toaster and particularly of the parts thereof embodying my invention will be described briefly. The operator drops a slice or slices of bread into the toaster through the openings 21 while the carriers are in their upper position and then presses on the push button detent knob 85. This releases the contact arm 71 from its normal open circuit position and permits it to engage contact arm 69 to thereby energize the thermal torque unit resulting in quick heating thereof and flexing of the free ends of the plurality of bimetal plates in a direction to engage and cause movement of the movement-multiplying parallel-motion linkage. It is thus evident that the outer end of arm 45 need be moved through a relatively short distance only to cause the movement of the bread carrier from its upper position shown in Fig. 1 to its lower position shown in Fig. 1.

When the bread carrier has been moved downwardly into toasting position, the pin 97 on arm 43 will have been moved into engagement with the hook-shaped upper end of detent 99 to thereby hold the bread carrier in toasting position for as long a time as shall be determined by the thermal timer 109.

The lower end 93 of arm 47 was moved into engagement with member 91 just before the carrier or carriers were in their toasting position with the result that contact arm 73 engaged contact arm 69 to thereby energize the toast heating elements as well as the thermal timer 109 to condition the same for operation. At the same time engagement between parts of member 91 and member 79 caused contact arm 71 to move to the left, as seen in Fig. 1 and as hereinbefore described, to be again engaged by the hook-shaped end of arm 87 to be held thereby out of engagement with intermediate contact arm 69. The timer 109 conditioned as hereinbefore described, became operative to determine the length of time of a toasting operation at the end of which time member 111 was moved toward the left or in a clockwise direction, as seen in Fig. 1, to cause it to engage a hook-shaped end 117 of arm 103 and thereby cause turning movement of detent 99 in a counter-clockwise direction with resultant release of pin 97 from detent 99 and return of the carrier to its upper position because of the action of the hereinbefore mentioned biasing spring 52.

It is, therefore, obvious that my invention provides a thermal power unit, which thermal power or torque unit is effective through the mechanism actuated thereby, to move the bread carrier into toasting position to cause energization of the toast heating elements as soon as the carrier is in its toasting position and also simultaneously to cause deenergization of the circuit including the plurality of bimetal bars electrically connected in circuit with each other and of such design and construction as to effect quick heating thereof with resultant quick flexing of the thermal power unit to cause the desired movement of the bread carriers.

Various modifications in the mechanism and system embodying my invention may be made without departing from the spirit and scope thereof and I therefore desire that all such modifications as are clearly covered by the appended claims shall be included as a part of my invention.

I claim as my invention:

1. Means to move a bread carrier in an automatic electric toaster comprising toast heating elements, a bread carrier movable into toasting and non-toasting positions relatively to the toast heating elements and normally yieldingly biased into non-toasting position and a detent to hold it in toasting position, said carrier moving means comprising a plurality of bimetal bars, each of substantially U-shape, electrically connected in series circuit with each other, manually-actuable means to cause current flow through said bimetal bars with resultant heating and flexing of one end of said bars into operative engagement with said bread carrier and movement of the bread carrier into toasting position and into engagement with said detent and means moved by said carrier to cause cessation of said current flow when said carrier has engaged said detent.

2. Means to cause movement of a bread carrier in an automatic electric toaster comprising toast heating elements, a bread carrier movable into toasting and non-toasting positions relatively to the toast heating elements and normally yieldingly biased into non-toasting position and a detent to hold it in toasting position, said carrier moving means comprising a plurality of bimetal bars, each of substantially U-shape, electrically connected in series circuit with each other, a normally open control switch for said plurality of bimetal bars biased to closed position, manually-actuable means to effect closing of said switch, current flow though the bimetal bars, movement of one end of the bars into operative engagement with the carrier to cause movement of the carrier into toasting position and means actuated by the carrier and effective when the carrier moves into its toasting position to open said control switch for the bimetal bars and to cause energization of the toast heating elements.

3. Means to initiate a toasting operation for an automatic electric toaster comprising toast heating elements, a bread carrier movable into toasting and non-toasting positions relatively to the toast heating elements and normally yieldingly biased into non-toasting position, a detent to hold the carrier in toasting position, a thermal timing means for causing release movement of said detent and a normally open control switch for said toast heating elements, said operation initiating means including a thermal torque unit comprising a plurality of bimetal bars, of substantially U-shape, means to fixedly support one end of said bimetal bars, an electric circuit for said bimetal bars including a control switch normally biased to closed position, a detent for normally holding the control switch for said bimetal bars in open position, a manually-actuable lever arm for releasing said control switch detent to cause an electric current to flow through said bimetal bars and flex the same and means actuated by said flexed thermal torque unit to cause movement of the bread carrier into toasting position and into operative engagement with said carrier detent, closure of the control switch for said toast heating elements, opening of the control switch for the circuit of the bimetal bars and engagement thereof with said last named detent and energization of the thermal timer.

4. An operation initiating means for an automatic electric toaster comprising toast heating elements, a bread carrier movable into toasting and non-toasting positions relatively to said toast heating elements and normally yieldingly biased into non-toasting position, a detent to hold it in toasting position, a timing means to cause carrier-release movement of said detent and a normally open control switch for said toast heating elements, said operation initiating means comprising a thermal torque unit including a plurality of bimetal plates each having a plurality of longitudinal slots alternately open at opposite ends of the plate, manually actuated means to cause current flow through said bimetal plates to cause heating and flexing thereof and means operatively engaged by said flexing bimetal plates to cause movement of the bread carrier into toasting position and into engagement with said detent, to cause closure of the switch for said toast heating elements and consequent energization thereof, to cause termination of the current flow through the bimetal bars and to condition the timing means for operation.

5. An operation initiating means for an automatic electric toaster comprising toast heating elements, a bread carrier movable into toasting and non-toasting positions relative to the toast heating elements and normally yieldingly biased into non-toasting position, a detent to hold it in toasting position, a timing means to cause carrier-release movement of said detent, a normally open control switch for said toast heating elements and a movement-multiplying parallel-motion linkage mechanically connected to said bread carrier, said operation initiating means comprising a thermal torque unit including a plurality of bimetal plates each having a plurality of longitudinal slots alternately open at opposite ends of the plate, manually-actuable means to cause current flow through said bimetal plates to cause heating and flexing thereof into operative engagement with said parallel-motion linkage to cause one part of said linkage to engage said detent to thereby hold said bread carrier in toasting position, to cause said linkage to effect closing of the toast heating element control switch, to cause said linkage to terminate the current flow through the bimetal bars and to cause energization and operation of the timing means.

JOHN R. GOMERSALL.